Figure 1:
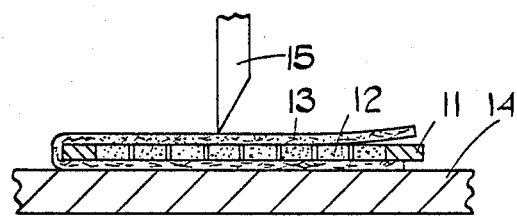

United States Patent [19]

Thomas

[11] 4,429,442

[45] Feb. 7, 1984

[54] METHOD OF PRODUCING A LEAD-ACID BATTERY UTILIZING VIBRATIONAL ENERGY

[75] Inventor: Brian J. Thomas, Shirley, England

[73] Assignee: Lucas Industries Limited, Birmingham, England

[21] Appl. No.: 192,274

[22] Filed: Sep. 30, 1980

[30] Foreign Application Priority Data

Oct. 2, 1979 [GB] United Kingdom ............... 7934142

[51] Int. Cl.³ ........................................... B23P 13/00
[52] U.S. Cl. ......................................... 29/2; 141/1.1
[58] Field of Search ................. 29/2; 141/1.1, 32, 33; 429/235, 236

[56] References Cited

U.S. PATENT DOCUMENTS

| | | | |
|---|---|---|---|
| 383,560 | 5/1888 | Faure | 141/1.1 |
| 417,088 | 12/1889 | Pumpelly | 141/1.1 |
| 1,659,654 | 2/1928 | Hazelett | 29/2 |
| 2,373,082 | 0/0000 | Staelin | |
| 2,616,165 | 11/1952 | Brennan | 29/2 X |
| 2,724,733 | 11/1955 | Hagspihl et al. | 29/2 X |
| 3,272,654 | 9/1966 | Lang | 29/2 |
| 3,615,832 | 0/0000 | Malloy et al. | |
| 3,758,340 | 9/1973 | Adams | 141/1.1 |
| 3,859,135 | 1/1975 | Roberts et al. | 141/1.1 |
| 4,029,856 | 6/1977 | Cromer et al. | 141/1.1 X |

FOREIGN PATENT DOCUMENTS

| | | |
|---|---|---|
| 1213471 | of 0000 | France . |
| 1345090 | of 0000 | France . |
| 1501850 | of 0000 | France .. |
| 1555086 | of 0000 | France . |
| 2140150 | of 0000 | France . |
| 467696 | of 0000 | United Kingdom . |
| 1213471 | of 0000 | United Kingdom . |
| 1393528 | of 0000 | United Kingdom . |

Primary Examiner—Horace M. Culver
Attorney, Agent, or Firm—Ladas & Parry

[57] ABSTRACT

In a method of producing a lead-acid battery plate, a lead oxide-containing paste is supplied to a carrier and the exposed surface of the paste on the carrier is contacted with a layer of fibrous material. Vibrational energy is then supplied to the fibrous layer so as to cause the paste to impregnate the fibrous layer and thereby secure the fibrous layer to the plate.

8 Claims, 2 Drawing Figures

METHOD OF PRODUCING A LEAD-ACID BATTERY UTILIZING VIBRATIONAL ENERGY

This invention relates to lead-acid battery plates of the kind including a carrier supporting a paste containing oxides of lead.

One problem experienced with conventional lead-acid battery plates of the kind specified is retention of the paste by the carrier. Thus, in service, as a result of corrosion of the carrier and/or loss of adhesion between the carrier and the paste, the carrier tends to shed its paste thereby leading to disintegration of the plate. One known method of reducing the problem of paste shedding is to lay a synthetic resin mesh or net on the surface of the pasted plate and then roll or press the mesh or net into the paste. However, although this known method results in some improvement in the paste-retaining properties of the carrier, it does not provide a completely satisfactory solution to the shedding problem, particularly with positive plates for electric vehicle batteries. Moreover, in view of the pressure necessary to embed the mesh or net in the paste, the method is unsuitable for use with fragile and/or synthetic resin carriers. An object of the present invention is therefore to overcome or alleviate the abovementioned problems experienced in the prior art.

Accordingly, the invention resides in one aspect in a method of producing a lead-acid battery plate of the kind specified comprising the steps of:

(a) supplying the paste to the carrier,
(b) contacting the exposed surface of the paste on the carrier with a layer of fibrous material, and
(c) supplying vibrational energy to the fibrous layer so as to cause the paste to impregnate the fibrous layer and thereby secure the fibrous layer to the plate.

In the method described in the preceding paragraph, the vibrational energy is found to cause the paste to flow to the outer surface of the fibrous layer so that the fibrous layer is impregnated with paste throughout its entire thickness. By way of contrast, the conventional rolling or pressing method is only able to cause limited paste penetration into the mesh or net. Thus the use of vibrational energy to impregnate the fibrous layer with paste ensures improved mechanical keying and physical bonding between the paste and the protective fibrous layer, thereby improving the paste-retaining properties of the plate. This not only reduces the tendency for paste-shedding in service, but also strengthens the plate thereby improving the resistance of the plate to mechanical shock during handling. Moreover, since the carrier experiences little or no compressive forces during impregnation of the fibrous layer with the paste, the method of the invention can be used with lightweight and fragile carriers, such as lead-coated aluminium and lead-coated synthetic resin. In addition, it is found that impregnating pasted plates with a fibrous material in accordance with the method of the invention improves the consistency in weight of the plates.

In the method of the invention, the paste carrier is preferably in the form of an electrically conductive, latticetype grid which supports the paste in the interstices of the lattice. The grid can then be formed of a lead-based alloy conventionally used in the manufacture of lead-acid battery plates, for example a lead-antimony alloy or a lead-calcium alloy, although other grid materials, such as lead-coated aluminium and lead-coated synthetic resin can also be employed. It is, however, to be appreciated that the paste carrier can be formed of a non-conductive material, in which case the plate would be provided with a separate current collector.

Preferably, the fibrous layer is formed of a non-conductive material, such as a glass fibre mat or a randomly orientated, woven or knitted synthetic resin fabric. Conveniently the synthetic resin is a polyester. However, as an alternative, the fibrous layer may be composed of an electrically conductive material, such as carbon fibres or lead-coated glass fibres, in which case the fibrous layer may also constitute the current collector of a plate employing a non-conductive paste carrier. It will also be understood that electrically conductive fibrous layers can be used to improve the conductivity of plates having conductive carriers.

The texture and thickness of the fibrous layer are not critical but, from the point of view of handlability in production, it is preferred to ensure that the thickness of the fibrous layer is at least 0.01 cm. In addition, to avoid unnecessary wastage of space in the final battery, it is preferable to ensure that the thickness of the fibrous layer does not exceed 0.1 cm. The preferred thickness for the fibrous layer is between 0.02 cm. and 0.05 cm. By virtue of its fibrous nature, the fibrous layer is porous and, although the degree of porosity is not critical, the best results are obtained when the porosity of the fibrous layer is between 15 and 95%.

Normally, the paste is exposed on opposite surfaces respectively of the carrier and fibrous layers are caused to impregnate the paste exposed on said opposite surfaces of the carrier. In this case, the fibrous layers may form respective parts of a single sheet of fibrous material folded around the carrier or may be in the form of separate sheets of fibrous material.

The paste used in the present invention is conventional lead-acid battery paste prepared by mixing lead oxide, water metallic lead particles and sulfuric acid together, in some cases, with additives, such as terylene floc, to improve the properties of the paste. The physical properties of the paste, of which texture and consistency are the most important, are not critical, although in practice the consistency of the paste is normally chosen so as to have a value between 11 and 30 on the Globe penetration scale. In this respect, it is to be appreciated that the Globe penetration scale is a well-accepted method of measuring the consistency of lead-acid battery paste and uses the depth to which a plunger falling under its own weight penetrates the paste as a measure of the stiffness of the paste. Moreover, although the consistency of the paste is not critical, with paste having a low water content, which normally means a low Globe penetration number, it may be necessary to dampen the paste and/or the fibrous material with water prior to supplying vibrational energy to the fibrous layer to impregnate the paste into the fibrous layer. If, on the other hand, the paste has a high water content, prior dampening of the paste and/or the fibrous layer is unnecessary. To avoid or reduce the need to dampen the paste it is desirable to apply the fibrous material immediately after pasting the carrier and before surface drying of the paste.

Preferably, the paste is supplied to the carrier during step (a) so that the paste is distributed substantially uniformly over the carrier. In the normal situation where the carrier is a lattice-type grid, the paste is preferably supplied to the grid so as to be uniformly distributed in the interstices of the grid and so as to project from at least one surface of the grid, that is so that the grid is overpasted on at least one surface. To distribute the paste uniformly over a grid, any of the conventional battery pasting machines can be used, including the fixed orifice type machine, such as the Lund machine, or the belt-type pasting machine, such as the Winkel machine. Alternatively, the grid can be pasted by supplying ultrasonic energy to the paste to cause the paste to flow into the interstices of the grid, as disclosed in our British Pat. No. 1213471. As a further alternative, the paste can be supplied to the carrier in step (a) as an undistributed mass, in which case the application of vibrational energy to the fibrous layer serves to distribute the paste over the carrier as well as impregnate the paste into the fibrous layer.

The frequency and amplitude of the vibrational energy supplied to the fibrous material are not critical. All that is required is that the frequency should be sufficiently high, for a given amplitude, to transfer energy to the paste to cause it to impregnate the fibrous material. In practice, the vibrational energy will normally be supplied to each fibrous layer by a sonotrode vibrating at ultrasonic frequencies, with the plate and the sonotrode undergoing relative longitudinal displacement so that the sonotrode traverses the surface of the fibrous layer. Typical amplitudes for the sonotrode vibration would be 0.05 to 0.5 mm.

Figure 2:
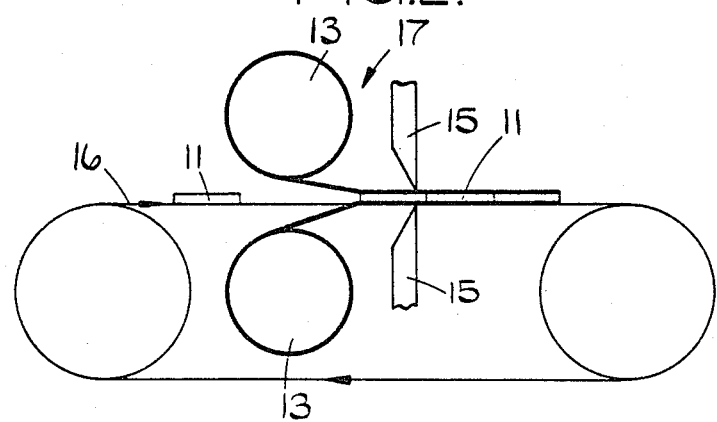

In the accompanying drawings,

FIG. 1 is a diagrammatic illustration of one stage during a method according to a first embodiment of the invention, and FIG. 2 is a diagrammatic illustration of a second embodiment of the invention.

Referring to FIG. 1, in the method of the first embodiment a conductive lattice-type grid 11, conveniently formed from lead or a lead alloy, is pasted by a belt-type pasting machine with a conventional lead-acid battery paste 12. The pasting is arranged so that one surface of the grid 11 is over-pasted, that is so that the paste 12 projects from said one surface of the grid 11, the paste lying substantially flush with the other surface of the grid. Immediately after pasting, the other surface of the grid is laid on a sheet 13 of flexible, non-conductive fibrous material which may have previously been dampened with water.

The sheet 13 is supported on a horizontally disposed, movable platen 14 and the pasted grid is placed at one end of the sheet 13 so that a terminal lug of the grid projects from the sheet. The sheet is then folded around the end of the grid remote from the terminal lug, whereafter the encapsulated grid is transported by the platen 14, with the folded edge of the sheet 13 leading, past an ultrasonically vibrating sonotrode 15. The sonotrode 15 is arranged to make intimate contact with, and traverse the entire uppermost surface of, the sheet 13 and causes the paste 12 to flow into and impregnate the entire thickness of the sheet so that the paste is visible at the uppermost surface of the sheet. The plate is then inverted and again passed beneath the sonotrode. A strong physical bond is thereby produced between the sheet 13 and the paste at both surfaces of the grid 11 despite the fact that only one surface of the grid is overpasted. It is, however, to be appreciated that the method can also be employed with grids which have been overpasted on both surfaces.

FIG. 2 illustrates an automated process for producing lead-acid battery plates in which a chain-type conveyor 16 transports grids 11 from a pasting station (not shown) to a treatment station 17. At the station 17, sheets of fibrous material 13 are fed from rolls 18 into contact with both major surfaces of the pasted grids. The sheets 13 with the grids sandwiched therebetween are then passed between a pair of vertically spaced sonotrodes, the disposition of the chains of the conveyor 16 and the shape of the sonotrodes being such as to permit free access of both sonotrodes to their adjacent sheets 13. The resultant protected plates are physically interconnected by regions of the sheets 13 which are subsequently removed to separate the plates. Conveniently, the sheets are sprayed or dipped in water prior to contacting the grids 11.

In a third embodiment (not shown), an unpasted grid is laid on one end of a sheet of fibrous material and then the required paste is supplied to the grid, conveniently without distributing the paste evenly over the grid. The fibrous sheet is then folded over the grid to encapsulate the grid and paste whereafter, as in the first embodiment, the encapsulated grid is fed beneath an ultrasonically vibrating sonotrode. In this case, however, the ultrasonic energy not only causes the paste to penetrate the fibrous sheet, but also to spread the undistributed paste evenly over the grid.

The invention will now be described more particularly by reference to the following Examples.

EXAMPLE 1

A lead-acid battery paste was prepared from 958 kg of a standard ball-milled lead oxide powder containing free metallic lead powder, 400 g of terylene floc having an average length of 6 mm, 80$\lambda$ of sulphuric acid (1.4 S.G.) and 132$\lambda$ of water. The paste was mixed in a Beardsley and Piper paste mixer and had a value of 19 on the Globe penetration scale. The paste was then applied to a 6% antimonial lead alloy grid using a Winkel belt-type pasting machine so that the grid was overpasted on one side by between 20 and 40 g above the specified paste weight of 175–185 g.

Immediately after pasting, a sheet of spunbonded polyester material supplied by Dupont Limited as Reemay type 2116 (about 70% porous and composed of randomly dispersed, continuous filament polyester fibres bonded at the filament junctions) was wrapped around the pasted grid and dampened with water, whereafter the encapsulated grid was passed beneath an ultrasonically vibrating sonotrode in the manner disclosed in FIG. 1. The sonotrode was composed of titanium and was vibrated at an amplitude of 0.1–0.15 mm by a Branson and Dawe 600 W/20 kHz ultrasonic generator. During passage beneath the sonotrode, an excess of paste was seen to exude from the polyester sheet before being removed by the advancing tip of the sonotrode. Inspection of the wrapped plate after passage beneath the sonotrode showed the sheet to be firmly embedded into the surface of the paste, with the form of the grid lattice being well defined on the flush-pasted side of the grid and less so on the over-pasted side. The plate was examined after 24 hours, during which time it had been allowed to stand vertically in an open atmosphere, and the polyester sheet was found to be firmly united with the plate on both sides, considerable force being needed to detach the sheet.

After one week the wrapped plate was compared with a fully conditioned plate without a vibration-impregnated wrapping in a dropping test in which each was allowed to fall in turn twelve times from a height of 0.9 meter onto a wooden floor covered with polythene sheet. The plates were released in a horizontal attitude and were inverted after every three drops. The results of this test are shown in Table 1 below.

TABLE 1

|  | Weight before test (g) | Weight after test (g) | Weight loss (g) |
|---|---|---|---|
| Wrapped plate | 266.9 | 265.3 | 1.6 |
| Standard plate | 230.0 | 217.5 | 12.5 |

While there was no evidence of damage to the wrapped plate after the test, several pellets had completely broken away from the grid of the standard plate and remained attached to the plate only by the terylene floc introduced into the paste to improve its handling properties.

EXAMPLE 2

The procedure of the first Example was repeated with a variety of different fibrous wrapping materials and the plates produced were assembled into batteries which were then subjected to the Jungfer reversal test to measure their cycle life. The Jungfer reversal test, which was also performed on a battery having standard unwrapped plates, involved charging the batteries for 16 hours followed by discharging at 30A for 8 hours, resulting in approximately 4 hours discharge to 0 volts followed by 4 hours discharge in reverse mode. The batteries were considered to have failed when a cut-off voltage of 1.7 V was reached in less than 2.75 hours in two consecutive cycles on two cells out of three. The results of this test are shown in Table 2 below.

TABLE 2

| Fibrous Wrapping Material | Description of Fibrous Wrapping Material | Cycles to Failure |
|---|---|---|
| None | — | 22 |
| Dupont Reemay Type 2116 | Spunbonded Mat | 32 |
| Dupont Reemay Type 2133 | Spunbonded Mat | 39 |
| Derby Nyla Type 8551 | Warp Knitted | 43 |
| Furzebrook Type 13031 | Warp Knitted | 34 |
| Fez Austrofelt Type 5311/274 | Woven | 31 |

The results in Table 2 clearly demonstrate the improved cycle life obtained by providing the plates with a vibration-impregnated fibrous wrapping.

EXAMPLE 3

The procedure of Example 1 was repeated to produce 50 identical plates using the spunbonded polyester material supplied by Dupont Limited as Reemay type 2133 as the protective fibrous wrapping. The weight of each plate was measured before and after application of the fibrous wrapping and, whereas the variation in weight of the unwrapped pasted plates was about 20 g, this decreased to only 2.5 g after vibration impregnation of the fibrous wrapping.

I claim:

1. A method of producing a lead-acid battery plate including a carrier supporting a paste containing oxides of lead, comprising the steps of:
   (a) supplying the paste to the carrier,
   (b) contacting (an exposed surface) of the paste on the carrier with a layer of fibrous material, and
   (c) supplying vibrational energy to the fibrous layer so as to cause the paste to impregnate the fibrous layer and thereby secure the fibrous layer to the plate.

2. A method as claimed in claim 1, wherein the carrier is in the form of a grid defining a lattice structure and the paste is supported within interstices of the lattice so as to be exposed on opposite major surfaces respectively of the grid.

3. A method as claimed in claim 1 or claim 2, wherein the thickness of the fibrous layer is between 0.01 cm and 0.1 cm.

4. A method as claimed in claim 1 or claim 2, wherein the fibrous layer is between 15 and 95% porous.

5. A method as claimed in claim 1, wherein step (c) is performed immediately after (a) and (b) and before the surface of the paste has dried.

6. A method as claimed in claim 1, wherein the fibrous layer and/or the paste is dampened prior to supplying vibrational energy thereto.

7. A method as claimed in claim 1, wherein the vibrational energy is supplied to each fibrous layer by an ultrasonically vibrating sonotrode, with the plate and the sonotrode undergoing relative longitudinal displacement so that the sonotrode traverses the surface of the fibrous layer.

8. A method as claimed in claim 1 or claim 7, wherein the amplitude of the vibrational energy is between 0.05 and 0.5 mm.

* * * * *